US012753841B2

(12) United States Patent
Fangmeier et al.

(10) Patent No.: US 12,753,841 B2
(45) Date of Patent: Oct. 6, 2026

(54) VALVE

(71) Applicant: Neoperl GmbH, Müllheim (DE)

(72) Inventors: Martin Fangmeier, Auggen (DE); Philipp Oehler, Bad Krozingen (DE); Matthias Hauth, Todtnau/Muggenbrunn (DE); Burkhard Meyer, Buggingen (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 19/106,891

(22) PCT Filed: Aug. 11, 2023

(86) PCT No.: PCT/EP2023/072279
§ 371 (c)(1),
(2) Date: Feb. 26, 2025

(87) PCT Pub. No.: WO2024/052048
PCT Pub. Date: Mar. 14, 2024

(65) Prior Publication Data

US 2026/0022772 A1 Jan. 22, 2026

(30) Foreign Application Priority Data

Sep. 6, 2022 (DE) ......................... 202022105002.3

(51) Int. Cl.
*F16K 1/46* (2006.01)
*F16J 15/06* (2006.01)
*F16K 15/06* (2006.01)

(52) U.S. Cl.
CPC ............ *F16K 1/465* (2013.01); *F16J 15/062* (2013.01); *F16K 15/065* (2021.08)

(58) Field of Classification Search
CPC ............ F16K 1/46; F16K 1/465; F16J 15/062
See application file for complete search history.

(56) References Cited

U.S. PATENT DOCUMENTS

| | | | | |
|---|---|---|---|---|
| 1,313,554 | A | 8/1919 | Nielsen | |
| 2,929,401 | A | 3/1960 | Cowan | |
| 2,960,998 | A * | 11/1960 | Sinker | F16K 15/026 137/542 |
| 6,237,631 | B1 | 5/2001 | Giesler et al. | |
| 11,415,229 | B2 | 8/2022 | Burmester et al. | |
| 2019/0293330 | A1 | 9/2019 | Danielson et al. | |
| 2020/0400140 | A1 | 12/2020 | Bayyouk et al. | |

FOREIGN PATENT DOCUMENTS

| | | | |
|---|---|---|---|
| CN | 1293329 | C | 1/2007 |
| CN | 103591340 | A | 2/2014 |
| CN | 108443520 | B | 3/2021 |
| DE | 102016225742 | A1 | 6/2018 |
| JP | 2012207796 | A | 10/2012 |
| NZ | 585246 | A | 4/2012 |

* cited by examiner

*Primary Examiner* — P. Macade Nichols
(74) *Attorney, Agent, or Firm* — Volpe Koenig

(57) ABSTRACT

A valve (1) having an axially movable piston (2), wherein the piston (2) is arranged in a valve seat (3), the piston (2) has a peripheral groove (6) with a groove bottom (7), in which a sealing ring (12) is arranged, and a spacing between a piston axis (10) and the groove bottom (7) assumes, at least in an axial sectional plane, at least two different values in an axial region (21) around a contact point (13) between the sealing ring (12) and the groove bottom (7).

19 Claims, 5 Drawing Sheets

VALVE

CROSS-REFERENCE TO RELATED APPLICATIONS

This application is a 371 National Phase of PCT/EP2023/072279, filed Aug. 11, 2023, which claims priority from German Patent Application No. 20 2022 105 002.3, filed Sep. 6, 2022, both of which are incorporated herein by reference as if fully set forth.

TECHNICAL FIELD

The invention relates to a valve, wherein the valve has an axially movable piston, wherein the piston is arranged in a valve seat, wherein the piston has a peripheral groove with a groove bottom, in which a sealing ring is arranged. A valve of this type has multiple uses in practice.

SUMMARY

The invention is based on the object of providing a valve with improved use properties and sealing properties. The object is achieved by one or more of the features disclosed herein. Advantageous refinements are described in the description and claims that follow.

It is to be noted that the features which are indicated individually in the dependent claims can be combined in any desired technologically appropriate way with one another and define further refinements of the invention. Moreover, the features which are specified in the claims are stated and explained more precisely in the description, wherein further preferred refinements of the invention are shown.

According to the invention, in order to achieve the stated object, the one or more of the features disclosed herein are provided. In particular, it is therefore proposed according to the invention, in order to achieve the stated object, in the case of a valve of the type described at the outset that, at least in an axial sectional plane, a spacing between a piston axis and the groove bottom assumes at least two different values in an axial region around a contact point which is configured between the sealing ring and the groove bottom. The sealing properties of the valve can be improved in this way. A neutral equilibrium position of the sealing ring on the groove bottom which permits a plurality of equally allowable positions of the sealing ring can also be avoided in this way. In particular, very small local displacements of the sealing ring which would result in a decrease in the sealing action can be avoided in this way.

The valve is preferably configured as a sanitary valve and is used in the sanitary field, for example in a kitchen, a toilet and/or a bathroom.

It can be provided in the case of one advantageous refinement of the invention that the two different values lie on different sides of the contact point. In this way, the service life of the sealing ring can be increased, since the contact between the groove bottom and possible flaws of the sealing ring is minimized. As an alternative, the two different values can lie on the same side of the contact point. Flaws of this type can result, for example, on an equator, in particular in the case of a configuration of the sealing ring as an O-ring. It has been shown that parts or small pieces can break off in the case of a removal of overhangs at the equator which frequently coincides with a die split zone. A sealing action can be decreased by broken-off portions of this type. The refinement makes it possible that the sealing ring lies on the other side of its equator. This can achieve a situation where flaws have no effect or only a small effect on a sealing action.

In the case of a valve of the type described at the outset, as an alternative or in addition to the preceding solution, it can be provided according to the invention to achieve the stated object that a contour of the groove bottom defines a definite rest position of the sealing ring on the groove bottom in an axial region (for example, the above-mentioned axial region). In this way, the reliability of the sealing performance of the sealing ring can be increased. The axial region is preferably a second contact point.

An axial region can be understood to mean, for example, a region which is defined in the axial direction around a contact point (for example, the abovementioned contact point) between the sealing ring and the groove bottom.

The rest position is preferably configured along a complete orbit of the sealing ring around the piston. In this way, the mechanical production of the piston including the groove can be improved.

In the case of a valve of the type described at the outset, as an alternative or in addition to the preceding solutions, it can be provided according to the invention for achieving the stated object that, at least in an axial sectional plane, a connecting line between a contact point (for example, the abovementioned contact point) and a touch point, wherein the contact point is configured between the groove bottom and the sealing ring and the touch point is configured between the sealing ring and the valve seat, forms a straight line which runs through a center of a cord of the sealing ring. In this way, the positioning of the sealing ring in the case of static or dynamic loading can be improved, and the sealing performance can be increased.

Here, the center can be characterized, for example, by an area which extends with a radius of not more than 10%, in particular of not more than 5%, of a cord thickness of the sealing ring and/or with a radius of at most five times, in particular at most twice, a manufacturing tolerance of the sealing ring around a cord center point of the sealing ring. A configuration of this type of the center and an arrangement of the contact point and the touch point has proven particularly advantageous for the sealing performance of the sealing ring. In this way, guidance of a force line between the points, at which the sealing ring is clamped in during sealing, can be achieved close to the center point or through the center. This can improve support.

It can be provided in the case of one advantageous refinement of the invention that the sealing ring has an axial play in the groove.

In the prior art, it is typically the case that the sealing ring is gripped with contact on both sides of the groove or even with prestress, with the result that there is no axial play.

The configuration of play has the advantage that an additional freedom is introduced for positioning of the sealing ring, by way of which the sealing ring can be positioned in a very finely tuned manner with respect to manufacturing tolerances. The sealing ring and the valve seat can mate with one another more simply as a result of the configuration of an axial play, and geometrical redundancy can be avoided.

In practice, it is namely the case that, when the valve is closed, a punctiform contact arises between the sealing ring and the valve seat, which punctiform contact is widened to form a linear and partially full-area contact in the orbit of the sealing ring by further introduction of the piston.

As a result of the axial play design, the sealing ring can yield in such a way that a peripheral closure between the sealing ring and the valve seat becomes possible.

The play is preferably dimensioned to be at least so great that it exceeds a manufacturing tolerance of a dimension of the groove. In this way, axially non-loaded seating can be achieved.

It can be provided in the case of one advantageous refinement of the invention that the axial region is not greater than a fourth of an axial extent of the sealing ring, and, in addition or as an alternative, that the axial region can be selected to be arbitrarily small. The axial region is preferably not greater than an eighth of an axial extent of the sealing ring. In this way, prestresses on the sealing ring can be controlled and adjusted in an improved manner. In this way, sufficiently small structures can also be provided which define a position of the sealing ring.

It can be provided in the case of one advantageous refinement of the invention that a restoring element acts on the piston. The restoring element is preferably a spring. In this way, the valve can be used as a backflow inhibitor, for example as an RV cartridge. Backflow inhibitors are used to prevent undesired backflow, for example of used water, or to protect pressure-sensitive systems in the case of a fluctuating system pressure. The opening and closing direction of the piston can run along a piston axis. The piston axis can run parallel to flow lines of water throughflow, in particular the flow direction.

It can be provided in the case of one advantageous refinement of the invention that the valve seat has a mating contact surface, against which the sealing ring bears. The sealing ring preferably bears sealingly against the mating contact surface. In this way, the sealing performance of the sealing ring can be increased.

It can be provided in the case of one advantageous refinement of the invention that the mating contact surface is arranged in an oblique and, in addition or as an alternative, curved manner with respect to the piston axis. In this way, mechanical loading on the sealing ring can be decreased, and the service life of the sealing ring can be increased.

It can be provided in the case of one advantageous refinement of the invention that the groove bottom has a zone which, with the mating contact surface, encloses an angle of not greater than 20°. The angle is preferably not greater than 10°. The angle is particularly preferably not greater than 5°. In this way, the positioning of the sealing ring can be set. The invention has recognized here for the first time that a configuration of this type of the angle is particularly advantageous. In this way, clamping of the sealing ring between parallel or approximately parallel surfaces can also be achieved. This can be gentle on the material.

It can be provided in the case of one advantageous refinement of the invention that the groove bottom has a recess, with the result that an equator of the cord of the sealing ring remains contact-free. The round or oval cross section of the sealing ring can be called the cord of the sealing ring. The recess can be configured, for example, as a contact of two planes, wherein the perpendicular vectors of the planes taper at an obtuse or an acute angle. An acute angle is defined as an angle between 0° and 90°. An obtuse angle is defined as an angle between 90° and 180°. As an alternative, the recess can be configured as a groove, wherein the groove depth is constant. As an alternative, the recess can be configured as a groove, wherein the groove depth is non-constant, in particular variable. In this way, the structural configuration of the recess can achieve a situation where the equator of the cord of the sealing ring remains without contact and no loads occur on possible flaws of the sealing ring. In the prior art, it is namely frequently the case that flaws or locations with a decreased mechanical stability occur in the region of the equator of the cord of the sealing ring as a result of the manufacturing process of a sealing ring. The construction which is proposed here is intended to decrease or completely prevent the loading on flaws of this type.

It can be provided in the case of one advantageous refinement of the invention that the groove bottom has at least one step which makes contact with the sealing ring. The step is preferably rounded. In this way, improved positioning of the sealing ring within the groove can be achieved.

The step can be configured at one of the two contact points between a groove wall and the groove bottom. That region of the groove which is configured orthogonally with respect to the piston axis defined above is called the groove wall. That region of the groove which is delimited by the groove walls is defined as the groove bottom. The groove walls are the last contour portion before the exterior of the piston.

It can be provided in the case of one advantageous refinement of the invention that the groove bottom has a curvature radius which is greater than a curvature radius of the cord of the sealing ring. In this way, low-load rolling or sliding of the sealing ring along the groove bottom can be achieved.

It can be provided in the case of one advantageous refinement of the invention that the groove bottom has a chamfer which, with the piston axis, encloses an angle of smaller than 45° and, in addition or as an alternative, an angle of greater than 0°. The angle is preferably greater than 5°. In this way, the mechanical loading of the sealing ring can be decreased.

It can be provided in the case of one advantageous refinement of the invention that a drive of the piston is achieved via a drive apparatus. The drive apparatus is preferably a screw drive and, in addition or as an alternative, a hydraulic drive. In this way, a reliable and low-maintenance drive of the piston can be provided.

It can be provided in the case of one advantageous refinement of the invention that the recess is trough-shaped or tapers at an angle, in particular wherein the angle is smaller than 180°. The angle is preferably smaller than 175°. In this way, a mechanical construction can be provided which is simple and inexpensive to produce.

It can be provided in the case of one advantageous refinement of the invention that the sealing ring is configured as a round cord ring and, in addition or as an alternative, as an oval cord ring. The sealing ring is preferably configured as an O-ring. In this way, a sealing ring can be provided which can be produced inexpensively.

It can be provided in the case of one advantageous refinement of the invention that the sealing ring remains contact-free on at least one groove wall. The groove wall is preferably arranged orthogonally with respect to the piston axis. The groove wall can be considered to be the last contour portion before the exterior region of the groove. In this way, an improved sealing performance can be achieved, in particular in dynamic applications.

In the case of a valve of the type described at the outset, as an alternative or in addition to the preceding solutions, it can be provided according to the invention in order to achieve the stated object that, at least in the closed state of the valve, a contact point between the sealing ring and the groove bottom is arranged spaced apart from an equator of the sealing ring. That line of the cord of the sealing ring which runs through the center point of the cord of the sealing ring and is arranged orthogonally with respect to the piston axis of the piston is called the equator. In this way, the loading on possible flaws of the sealing ring which are due to the production process and frequently occur on the equator can be reduced.

BRIEF DESCRIPTION OF THE DRAWINGS

The invention will now be described in greater detail on the basis of a few exemplary embodiments, but is not restricted to these few exemplary embodiments. Further variants of the invention and exemplary embodiments result from the combination of the features of individual or multiple claims among one another and/or with individual or multiple features of the exemplary embodiments and/or the above-described variants of apparatuses according to the invention.

In the drawing.

DETAILED DESCRIPTION

In the case of the following description of different exemplary embodiments of the invention, elements which coincide in terms of their function are given coinciding designations even in the case of a differing design or shape.

For improved clarity, not all designations are used in the figures although the elements can certainly be present in the figures. Identical designations denote functionally and/or structurally identical components and functional units, however.

Figure 1:
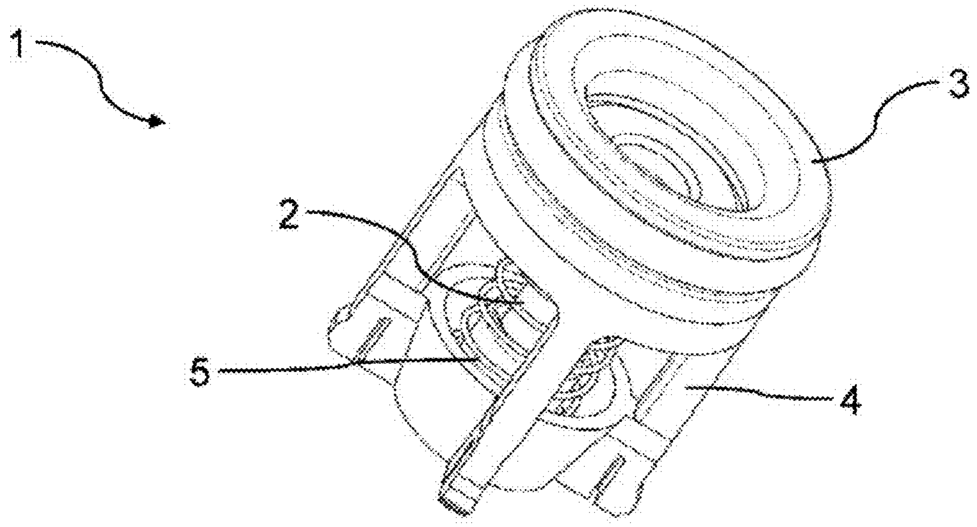
FIG. 1 shows a valve in a perspective view.

FIG. 1 shows a valve 1 in a perspective view.

The valve 1 has an axially movable piston 2, wherein the piston 2 is arranged in a valve seat 3. The valve 1 has, furthermore, a valve body 4. A restoring element 5 acts on the piston 2. The valve 1 is preferably configured as a sanitary valve in the sanitary area. The restoring element 5 is preferably configured as a spring.

Figure 2:
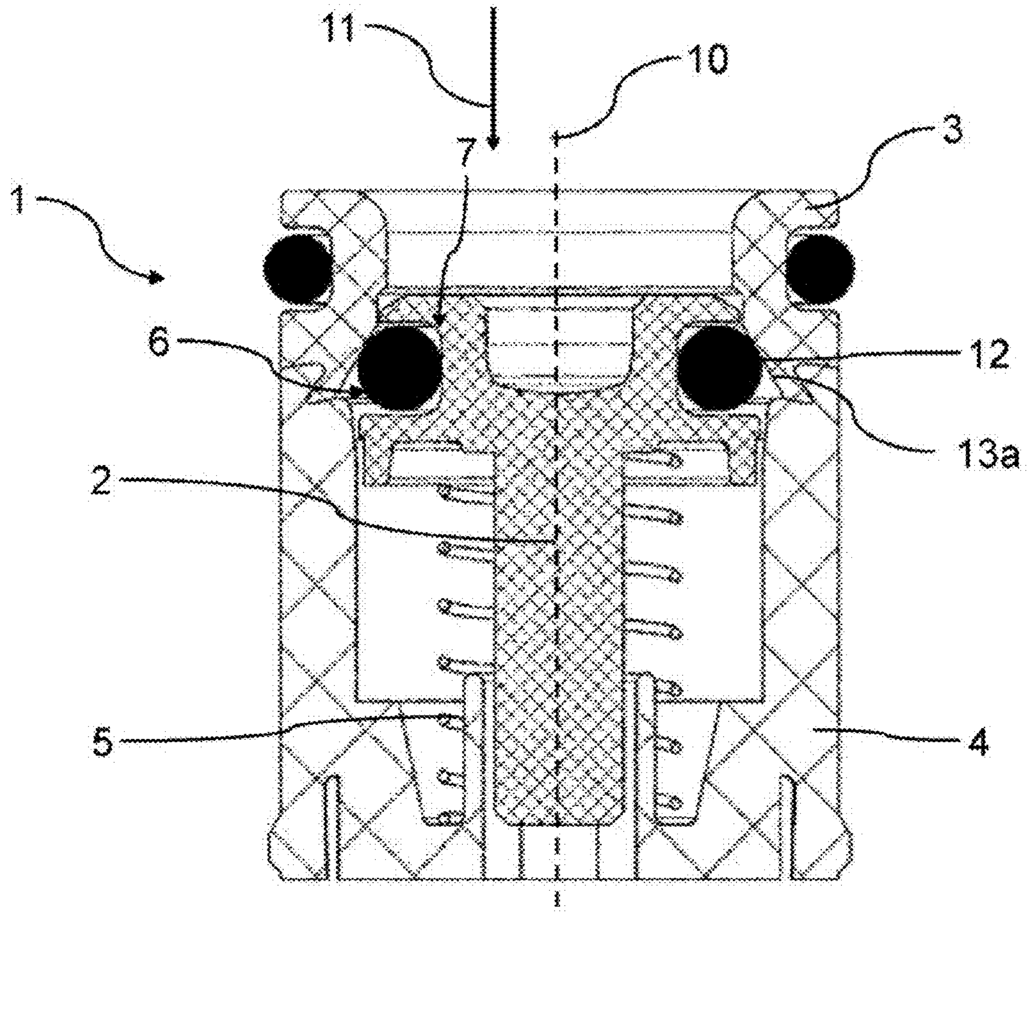
Fig. 2 (Prior Art)
FIG. 2 shows a valve from the prior art in a sectional illustration.

FIG. 2 shows a valve 1 from the prior art in a sectional illustration.

The valve 1 has an axially movable piston 2, wherein the piston 2 is arranged in a valve seat 3. The valve 1 has, furthermore, a valve body 4. A restoring element 5 acts on the piston 2. The piston 2 has a peripheral groove 6 which has a groove bottom 7. The groove bottom 7 is delimited by groove walls 8, 9. The groove walls 8, 9 are arranged orthogonally with respect to a piston axis 10. The piston axis 10 is arranged parallel to a flow direction 11. The flow direction 11 is shown by an arrow. The direction along the flow direction 11 is called the axial direction. The direction orthogonal with respect to the flow direction 11 is called the radial direction. A sealing ring 12 is arranged in the groove 6. The sealing ring 12 makes contact with the groove bottom 7 at a contact point 13. It is the case in the prior art that the groove 6 typically has a rectangular geometry; that is to say, the spacing between the groove bottom 7 and the piston axis 10 is constant. This can lead to undesired loads on the sealing ring 12 and can lead to problems in the adjustability of the opening and closing pressure of the valve 1. The invention comes into play here and aims to bypass or eliminate the disadvantages from the prior art.

Figure 3:
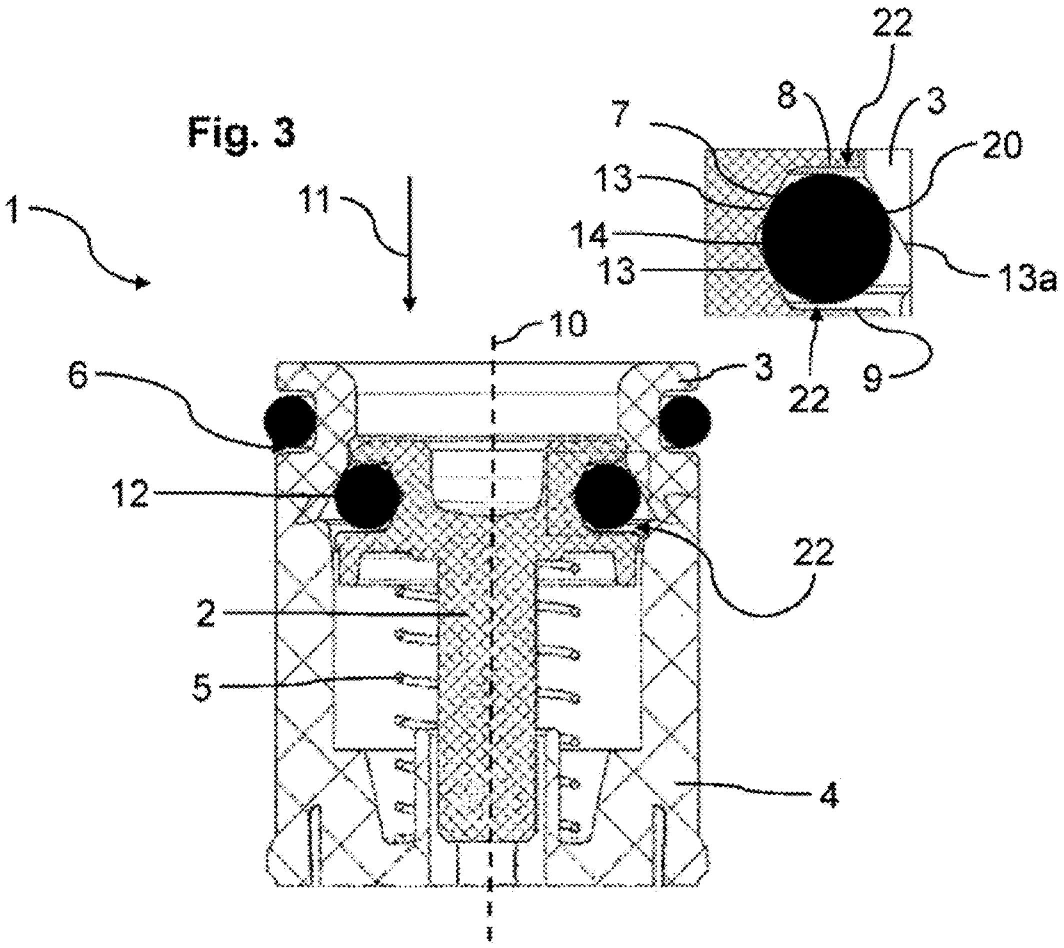
FIG. 3 shows a valve according to the invention in a sectional illustration and an associated enlarged detailed view.

FIG. 3 shows a valve 1 according to the invention in a sectional illustration, and an associated enlarged detailed view.

The valve 1 has similar elements here to the valve 1 of FIG. 2, wherein FIG. 2 shows the prior art, and the similar elements are not described separately here.

The piston 2 is arranged in the valve seat 3. The sealing ring 12 is made contact with from the outside by a mating contact surface 13*a* at a touch point 20, wherein the mating contact surface 13*a* belongs to the valve seat 3 and is arranged obliquely with respect to the piston axis 10. The sealing ring 12 has an axial play 22 in the groove 6. As an alternative, the mating contact surface 13*a* can be curved. FIG. 3 differs from FIG. 2 in that the groove 6 has an alternative groove geometry. The groove bottom 7 comprises two surfaces which taper toward one another at an angle. The angle is preferably smaller than 180°, particularly preferably smaller than 175°. A recess 14 is formed in the contact region of the two surfaces and between the contact region of the two surfaces around the sealing ring 12. The sealing ring 12 makes contact with the groove bottom 7 at two contact points 13 which are each situated above and below the recess 14. The terms above and below are to be understood in relation to the flow direction. The sealing ring 12 does not make contact with the groove walls 8, 9 here. The sealing ring 12 has an axial play 22 in the groove 6. Furthermore, the sealing ring 12 makes contact with the mating contact surface 13*a* of the valve seat 3 at the touch point 20. In the present exemplary embodiment, the sealing ring 12 is configured as a round cord ring, preferably as an O-ring. The configuration of the recess 14 which tapers at the abovementioned angle ensures that there is no contact between the groove bottom 7 and the sealing ring 12 in a region of the equator of the cord of the sealing ring 12, wherein flaws are frequently situated in the region of the equator of the cord of the sealing ring 12 on account of the production process of sealing rings 12. The invention therefore provides a remedy here.

The groove bottom 7 has a zone which, with the mating contact surface 13*a*, encloses an angle of not greater than 20°, preferably an angle of not greater than 10°, particularly preferably an angle of not greater than 5°.

Figure 4:
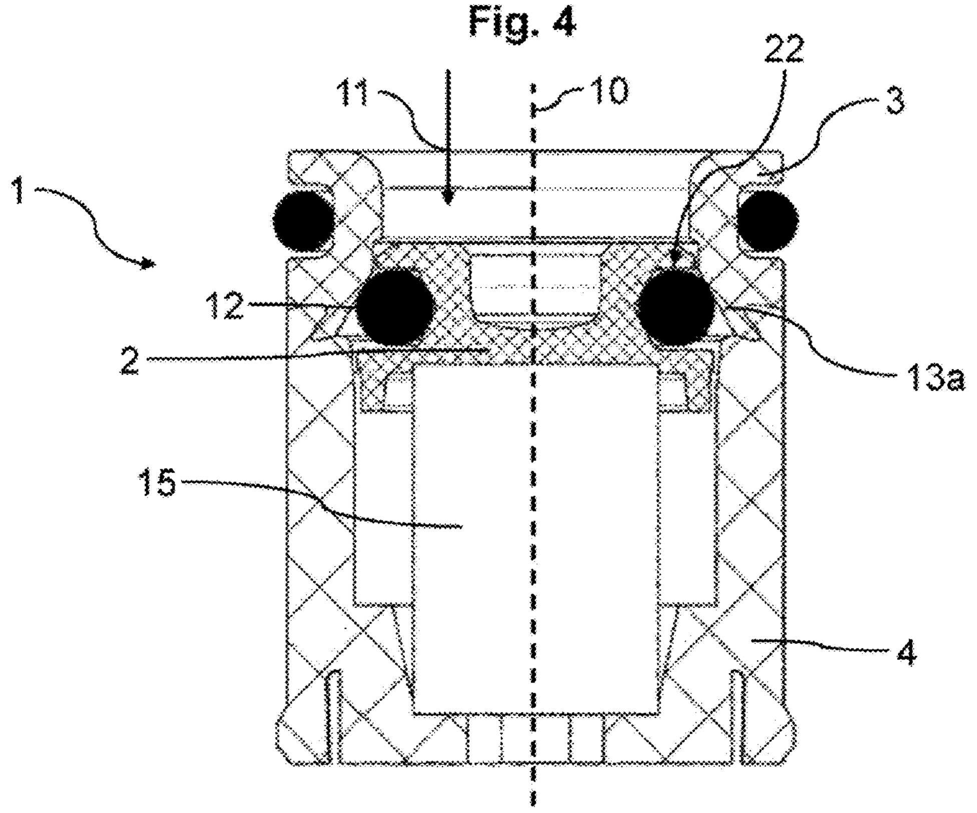
FIG. 4 shows the valve from FIG. 3 in a sectional illustration without an illustrated drive.

FIG. 4 shows the valve 1 from FIG. 3 in a sectional illustration without an explicitly shown drive 15.

The drive 15 of the piston 2 can be, for example, a screw drive and, in addition or as an alternative, a hydraulic drive. The screw drive can be actuatable mechanically and, in addition or as an alternative, electrically, and can adjust the position of the piston 2. The hydraulic drive can be characterized by a hydraulic force which can adjust the piston 2. Alternative drives 15 are also conceivable.

Figure 5:
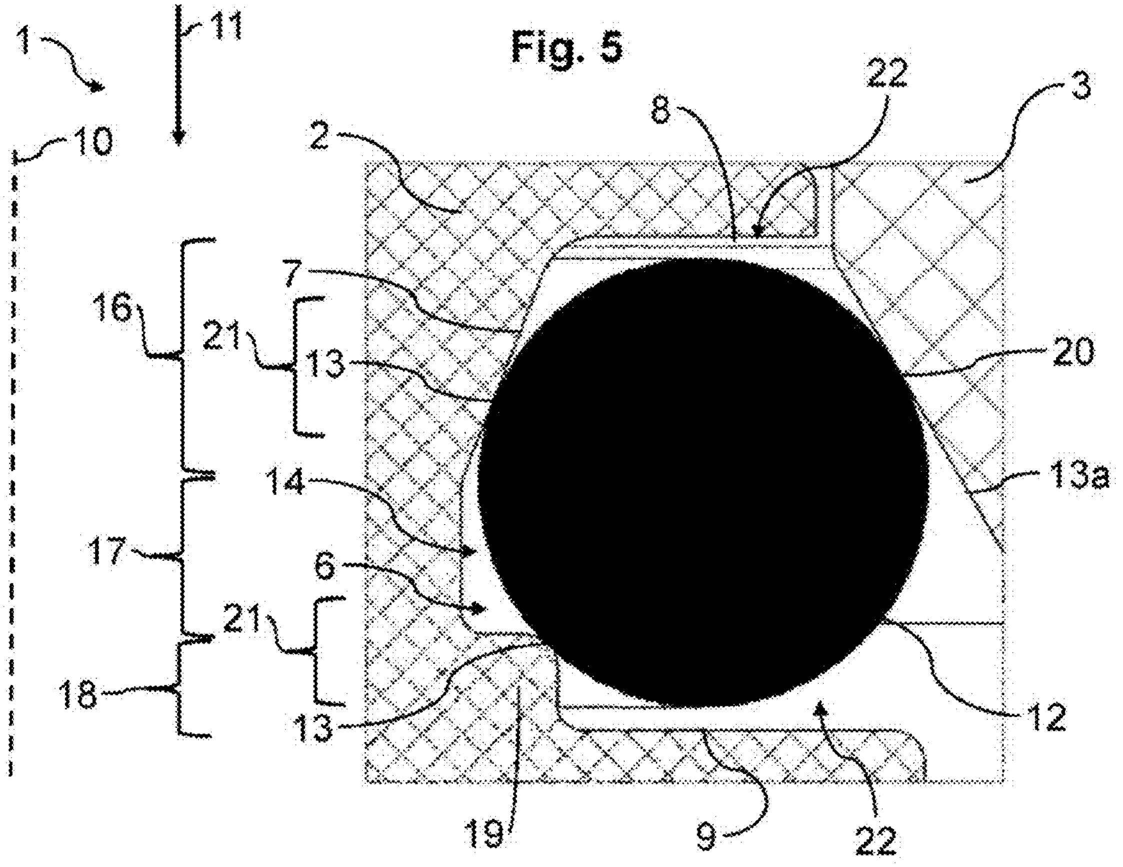
FIG. 5 shows a detailed view of a groove geometry of a valve according to the invention in a sectional illustration.

FIG. 5 shows a detailed view of a groove geometry of a valve 1 according to the invention in a sectional illustration.

The spacing between the groove bottom 7 and the piston axis 10 is variable here. Here, the groove bottom 7 comprises three regions: an oblique region 16, in which the groove bottom 7 is arranged obliquely with respect to the piston axis 10, a constant region 17, in which the groove bottom 7 is arranged parallel to the piston axis 10, and a step region 18, in which a step 19 is configured. The step 19 is preferably rounded. The sequence of the regions in the flow direction 11 is as follows: oblique region 16, constant region 17, step region 18. The sealing ring 12 makes contact with the groove bottom 7 at two contact points 13, wherein one of the two contact points 13 is situated in the oblique region 16 and the other of the two contact points 13 is situated in the step region 18. The sealing ring 12 makes contact with the valve seat 3 on the mating contact surface **13*a* at the touch point 20. The mating contact surface 13*a* is arranged obliquely with respect to the piston axis 10. The mating contact surface 13*a* can be curved as an alternative. On both axial sides, the sealing ring 12 has a play 22 in the groove 6**.

In the oblique region 16, the groove bottom 7 has a chamfer which, with the piston axis 10, encloses an angle of smaller than 45° and, in addition or as an alternative, an angle of greater than 0°, preferably an angle of greater than 5°.

The groove bottom 7 has a recess 14, with the result that an equator of the cord of the sealing ring 12 remains contact-free. In the present example, the recess 14 is wedge-shaped, but, as an alternative, it can also have different shapes. The recess 14 is situated between the oblique region 16 and the step 19 here.

The perpendicular vectors of the groove bottom 7 in the oblique region 16 and the mating contact surface **13*a*** enclose an angle which is obtuse.

The groove walls 8, 9 are contact-free in relation to the sealing ring 12. The arrangement of the contact points 13 ensures that the mechanical loading of the sealing ring 12 is relatively low.

Figure 6:
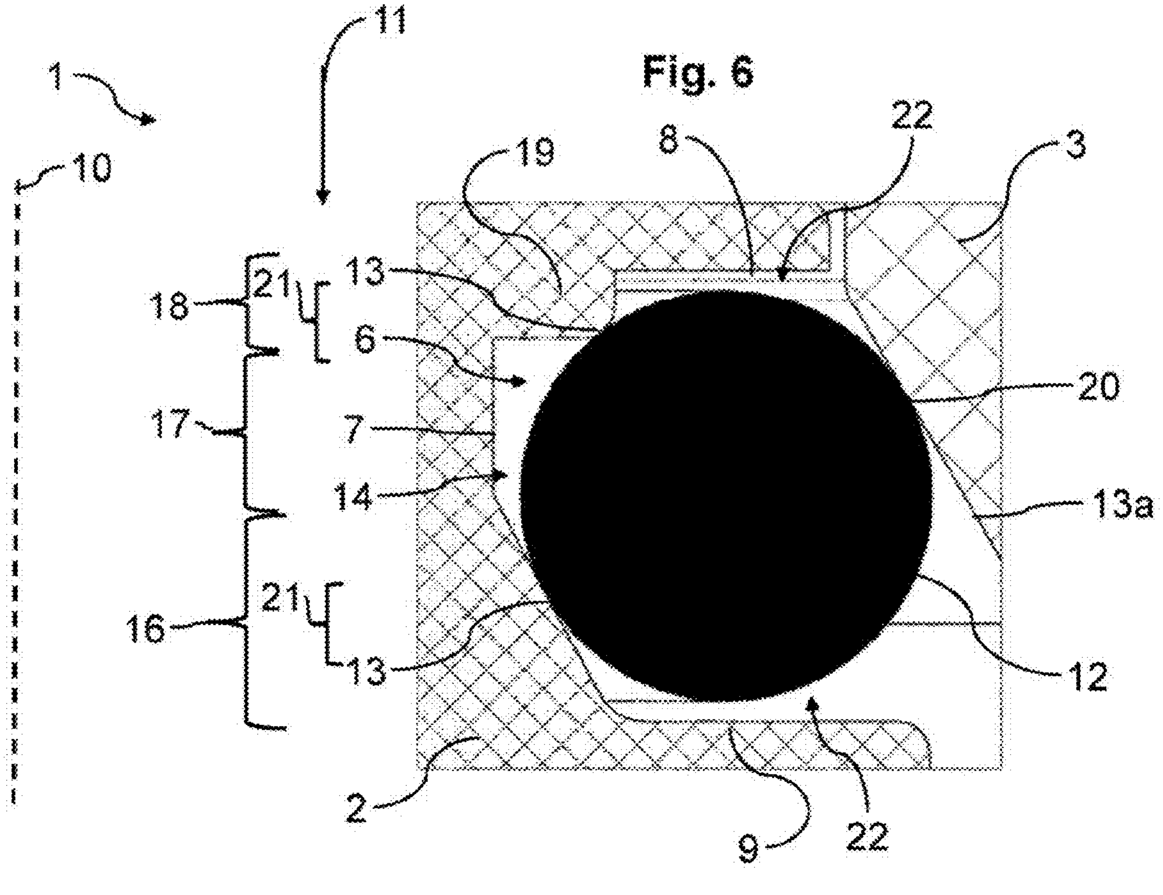
FIG. 6 shows a detailed view of a further groove geometry of a valve according to the invention in a sectional illustration.

FIG. 6 shows a detailed view of a further groove geometry of a valve 1 according to the invention in a sectional illustration.

The groove 6 has the groove walls 8, 9 and the groove bottom 7. The groove bottom 7 comprises three regions here: the step region 18, in which the step 19 is configured which is preferably rounded, the constant region 17, in which the groove bottom 7 is arranged parallel to the piston axis 10, and the oblique region 16, in which the groove bottom 7 is arranged obliquely with respect to the piston axis 10. The groove bottom 7 has a zone (in the present case, the oblique region 16) which, with the mating contact surface **13*a*, encloses an angle of not greater than 20°, preferably an angle of not greater than 10°, particularly preferably an angle of not greater than 5°. The mating contact surface 13*a* is arranged obliquely with respect to the piston axis 10. As an alternative, the mating contact surface 13*a* can be curved. The sequence of the regions in the flow direction 11 is as follows: step region 18, constant region 17, oblique region 16. The sealing ring 12 makes contact with the groove bottom 7 at two contact points 13, wherein the one contact point 13 is in the step region 18 and the other contact point 13 is in the oblique region 16**.

The sealing ring 12 makes contact with the valve seat 3 on the mating contact surface **13*a* at the touch point 20. The perpendicular vectors of the groove bottom 7 in the oblique region 16 and the mating contact surface 13*a*** enclose an angle which is acute. An acute angle defines an angle of between 0° and 90°. An obtuse angle defines an angle of between 90° and 180°.

A connecting line between the contact point 13, which lies in the oblique region 16 and is configured between the groove bottom 7 and the sealing ring 12, and the touch point 20 forms a straight line which runs through a center of the cord of the sealing ring 12.

Here, the center can be characterized, for example, by an area which extends with a radius of not more than 10%, in particular not more than 5%, of a cord thickness of the sealing ring 12 and/or with a radius of at most five times, in particular at most two times, a manufacturing tolerance of the sealing ring 12 around a cord center point of the sealing ring 12.

The groove walls 8, 9 are contact-free in relation to the sealing ring 12. The sealing ring 12 has an axial play 22 in the groove 6. The arrangement of the contact points 13 ensures that the mechanical loading of the sealing ring 12 is relatively low.

The groove bottom 7 has a recess 14, with the result that an equator of the cord of the sealing ring 12 remains contact-free. In the present exemplary embodiment, the recess 14 is wedge-shaped, but, as an alternative, it can also assume different shapes. The recess 14 is situated between the oblique region 16 and the step 19 here.

Figure 7:
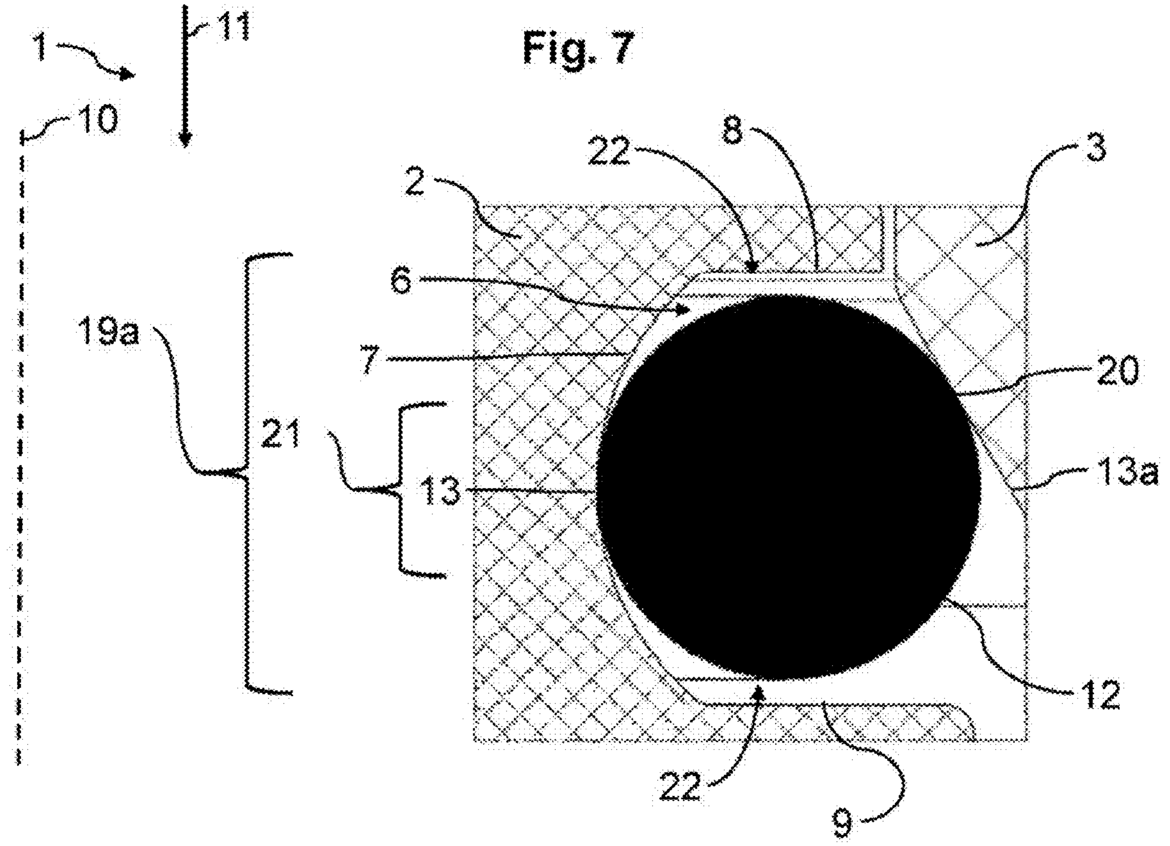
FIG. 7 shows a detailed view of a further groove geometry of a valve according to the invention in a sectional illustration.

FIG. 7 shows a detailed view of a further groove geometry of a valve 1 according to the invention in a sectional illustration.

The spacing between the groove bottom 7 and the piston axis 10 (shown only diagrammatically) is variable. The sealing ring 12 makes contact with the groove bottom 7 at the contact point 13. A curvature radius of the groove bottom 7 is greater than a curvature radius of the cord of the sealing ring 12. In addition, the sealing ring 12 makes contact with the mating contact surface **13*a* of the valve seat 3. The mating contact surface 13*a* is arranged obliquely with respect to the piston axis 10. The mating contact surface 13*a* can be of curved configuration as an alternative. The groove walls 8, 9 are contact-free in relation to the sealing ring 12. The sealing ring 12 has the axial play 22 in the groove 6 on both sides with respect to the groove walls 8, 9. The sealing ring 12 can slide on the curved groove bottom 7 in a dynamically loaded state. The specific construction described here of the groove geometry has the advantage that the sealing ring 12 is loaded only slightly, which can increase its service life. An axial region 21 can be defined around the contact point 13, in which axial region 21 the spacing between the piston axis 10 and the groove bottom 7 assumes at least two different values. The axial region 21 can be placed in any desired manner around the contact point 13; both symmetrical arrangements with respect to the contact point 13 and asymmetrical arrangements with respect to the contact point 13** are possible.

The groove 6 has a curved region **19*a***.

Figure 8:
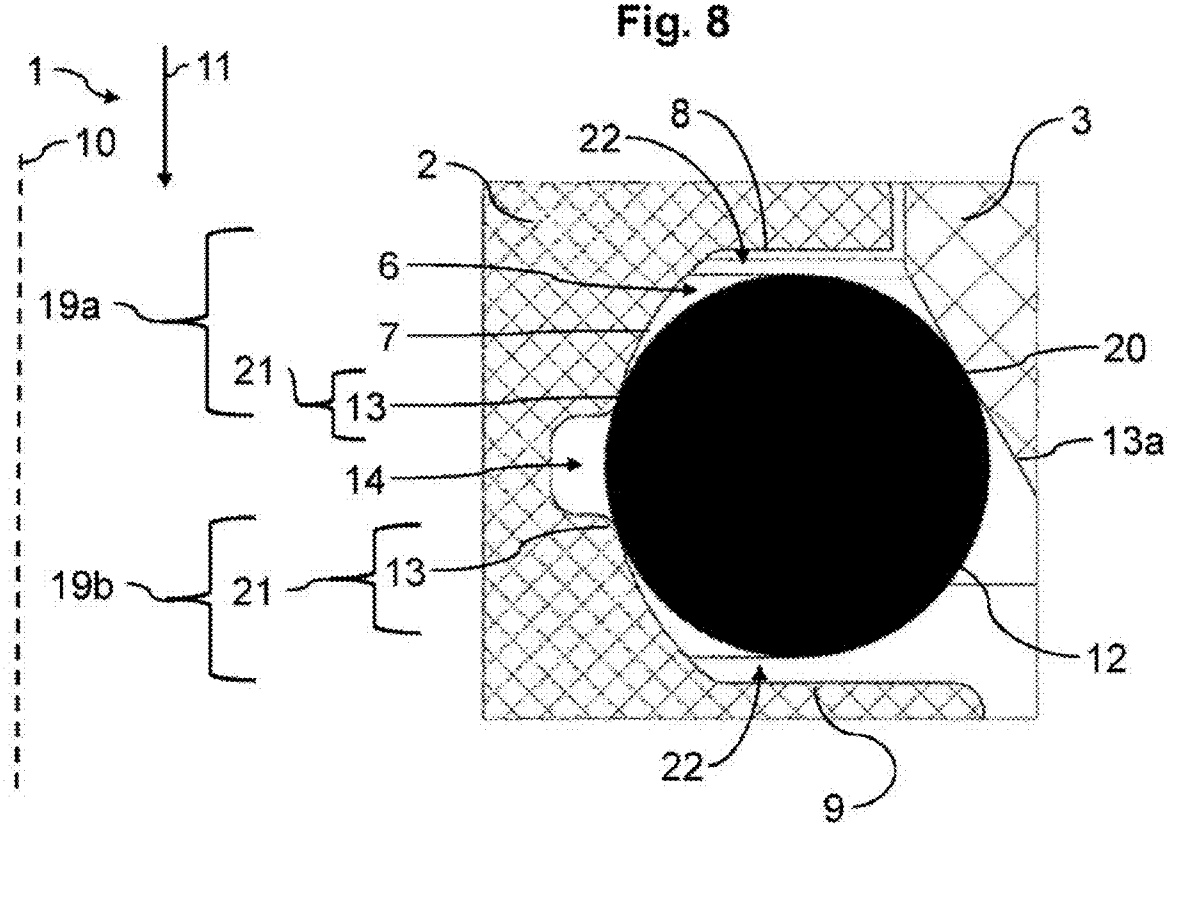
FIG. 8 shows a detailed view of a further groove geometry of a valve according to the invention in a sectional illustration.

FIG. 8 shows a detailed view of a further groove geometry of a valve 1 according to the invention in a sectional illustration. FIG. 8 shows an approximately similar groove geometry to FIG. 7.

The spacing between the groove bottom 7 and the piston axis 10 (shown diagrammatically here) is variable. The groove bottom 7 comprises two curved regions **19*a*, 19*b*. The curvature radii of the curved region 19*a* and the curved region 19*b* are of equal magnitude. The curvature radius of the curved regions 19***a*, 19*b* is greater than the curvature radius of the cord of the sealing ring 12.

The groove bottom 7 has a recess 14, at which the equator of the cord of the sealing ring 12 remains contact-free. This is the main difference between FIG. 7 and FIG. 8. The recess 14 is of trough-shaped configuration in the present exemplary embodiment. As an alternative, the recess 14 can be of wedge-shaped or angular configuration. As an alternative, the recess 14 can be partially circular. The recess 14 is arranged between the curved region 19*a* and the curved region 19*b*.

The sealing ring 12 makes contact with the groove bottom 7 on the curved region 19*a* and the curved region 19*b*. In addition, the sealing ring 12 makes contact at the touch point 20 with the mating contact surface 13*a* which is arranged obliquely with respect to the piston axis 10. As an alternative, the mating contact surface 13*a* can be of curved configuration. The groove walls 8, 9 remain contact-free in relation to the sealing ring 12. The sealing ring 12 has the abovementioned axial play 22 in the groove 6.

In the present exemplary embodiment, the design of the groove geometry ensures that the mechanical loads on the sealing ring 12 are minimized in static or dynamic states.

Figure 9:
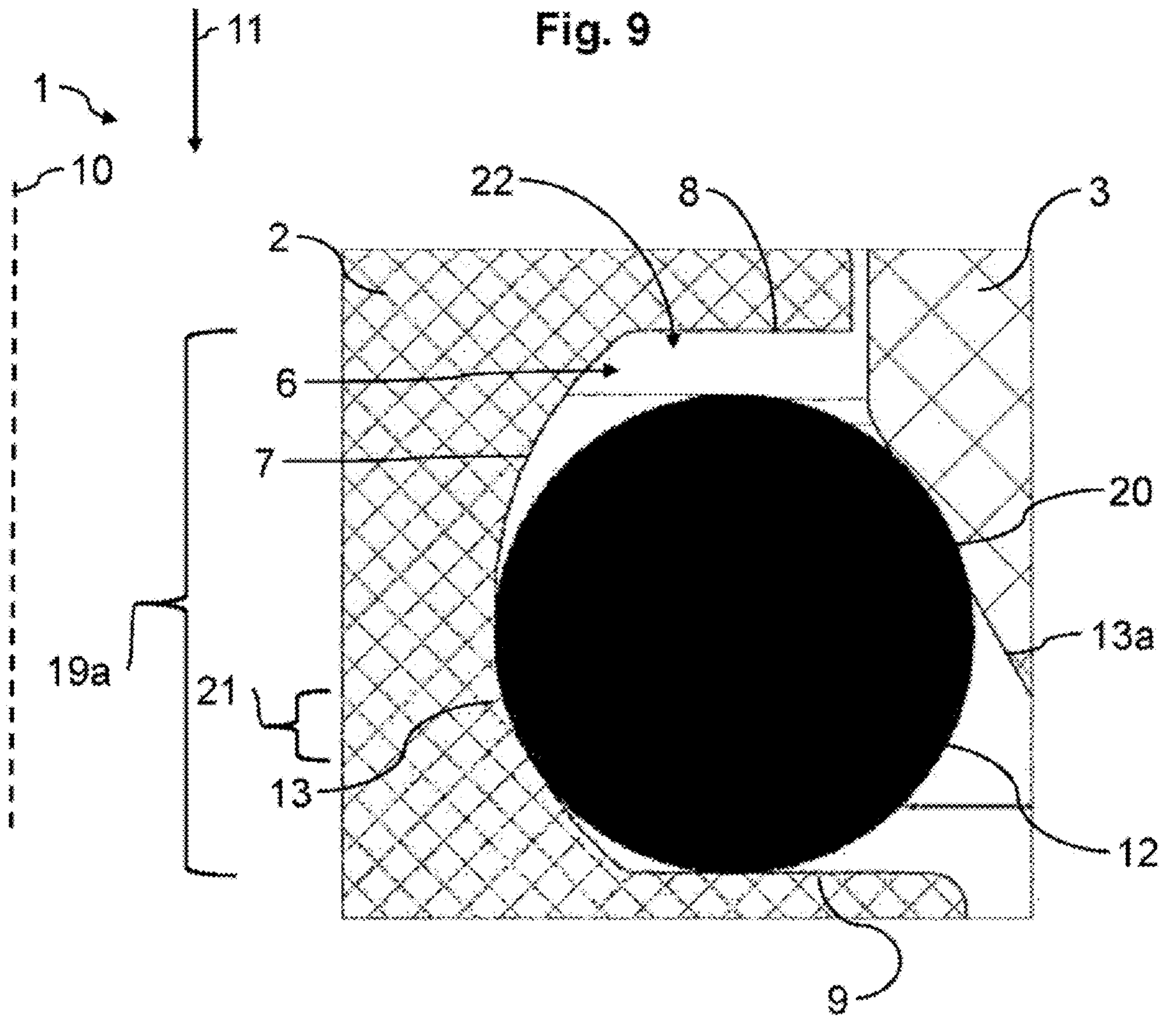
FIG. 9 shows a detailed view of the groove geometry of the valve from FIG. 7 in a sectional illustration and with a prevailing back pressure.

FIG. 9 shows a detailed view of the groove geometry of the valve 1 from FIG. 7 in a sectional illustration.

There is a back pressure in the present exemplary embodiment. Here, the sealing ring 12 makes contact with the groove bottom 7 at the contact point 13 and the groove wall 9. The other groove wall 8 remains contact-free in relation to the sealing ring 12. In addition, the sealing ring 12 makes contact with the mating contact surface 13*a* at the touch point 20. The mating contact surface 13*a* is configured obliquely with respect to the piston axis 10 (shown diagrammatically). As an alternative, the mating contact surface 13*a* can be of curved configuration. The back pressure is characterized by a pressure which acts counter to the typically prevailing flow pressure. This can be the case, for example, in a backflow inhibitor.

The groove 6 has the curved region 19*a*.

It is proposed that, in the case of a valve 1, wherein the valve 1 has an axially movable piston 2, wherein the piston 2 is arranged in a valve seat 3, wherein the piston has a peripheral groove 6 with a groove bottom 7, in which a sealing ring 12 is arranged, a (location-dependent) spacing between a piston axis 10 and the groove bottom 7 in an axial region 21 around a contact point 13 between the sealing ring 12 and the groove bottom 7 assumes at least two different values (in two different axial positions) at least in an axial sectional plane.

LIST OF REFERENCE NUMBERS

1 Valve
2 Piston
3 Valve seat
4 Valve body
Restoring element
6 Groove
7 Groove bottom
8 Groove wall
9 (Other) groove wall
Piston axis
11 Flow direction
12 Sealing ring
13 Contact point, contact points
13*a* Mating contact surface
14 Recess
Drive
16 Oblique region
17 Constant region
18 Step region
19 Step
19*a* Curved region
19*b* (Other) curved region
Touch point
21 Axial region
22 Play

The invention claimed is:

1. A valve (1), comprising:
an axially movable piston (2),
a valve seat (3) in which the axially movable piston (2) is arranged,
wherein the piston (2) has a peripheral groove (6) with a groove bottom (7),
a sealing ring (12) arranged in the groove bottom (7),
wherein at least in an axial sectional plane, a spacing between a piston axis (10) and the groove bottom (7) assumes at least two different values in an axial region (21) around a contact point (13) between the sealing ring (12) and the groove bottom (7),
wherein the sealing ring (12) has an axial play (22) in the groove (6).

2. The valve (1) as claimed in claim 1, wherein the two different values lie on different sides of the contact point (13).

3. The valve (1) as claimed in claim 1, wherein a contour of the groove bottom (7) in the axial region (21) defines a definite rest position of the sealing ring (12) on the groove bottom (7).

4. The valve (1) as claimed in claim 1, wherein, at least in an axial sectional plane, a connecting line between the contact point (13) and a touch point (20), in which the contact point (13) is configured between the groove bottom (7) and the sealing ring (12) and the touch point (20) is configured between the sealing ring (12) and the valve seat (3), forms a straight line which runs through a center of a cord of the sealing ring (12).

5. The valve (1) as claimed in claim 1, wherein the axial region (21) is not greater than a fourth of an axial extent of the sealing ring (12).

6. The valve (1) as claimed in claim 1, further comprising a restoring element (5) that acts on the piston (2).

7. The valve as claimed in claim 1, wherein the valve seat (3) has a mating contact surface (13*a*), against which the sealing ring (12) bears.

8. The valve (1) as claimed in claim 7, wherein the mating contact surface (13*a*) is arranged in at least one of an oblique or curved manner with respect to the piston axis (10).

9. The valve (1) as claimed in claim 7, wherein the groove bottom (7) has a zone which, with the mating contact surface (13*a*), encloses an angle of not greater than 20°.

10. The valve (1) as claimed in claim 4, wherein the groove bottom (7) has a recess (14), such that an equator of the cord of the sealing ring (12) remains contact-free.

11. The valve (1) as claimed in claim 1, wherein the groove bottom (7) has at least one step (19) which makes contact with the sealing ring (12).

12. The valve (1) as claimed in claim 4, wherein t the groove bottom (7) has a curvature radius which is greater than a curvature radius of the cord of the sealing ring (12).

13. The valve (1) as claimed in claim 1, wherein the groove bottom (7) has a chamfer which, with the piston axis (10), encloses an angle of smaller than 45° and greater than 0°.

14. The valve (1) as claimed in claim 1 further comprising a drive (15) for the piston (2).

15. The valve (1) as claimed in claim 1, wherein the recess (14) is trough-shaped or tapers at an angle.

16. The valve (1) as claimed in claim 1, wherein the sealing ring (12) is configured as at least one of a round or oval cord ring.

17. The valve (1) as claimed in claim 1, wherein the sealing ring (12) remains contact-free on at least one groove wall (8, 9) of the groove (6).

18. The valve (1), comprising:

an axially movable piston (2), a valve seat (3) in which the axially movable piston (2) is arranged, wherein the piston (2) has a peripheral groove (6) with a groove bottom (7), a sealing ring (12) arranged in the groove bottom (7), and at least in the closed state of the valve (1), a contact point (13) between the sealing ring (12) and the groove bottom (7) is arranged spaced apart from an equator of the sealing ring (12), wherein the sealing ring (12) has an axial play (22) in the groove (6).

19. A valve (1), comprising:

an axially movable piston (2), a valve seat (3) in which the axially movable piston (2) is arranged, wherein the piston (2) has a peripheral groove (6) with a groove bottom (7), a sealing ring (12) arranged in the groove bottom (7), and a contour of the groove bottom (7) in an axial region (21) defines a definite rest position of the sealing ring (12) on the groove bottom, wherein the sealing ring (12) has an axial play (22) in the groove (6).

* * * * *